(12) United States Patent
Ninomiya et al.

(10) Patent No.: US 12,329,308 B2
(45) Date of Patent: Jun. 17, 2025

(54) BEVERAGE SERVER

(71) Applicant: FUJI ELECTRIC CO., LTD., Kawasaki (JP)

(72) Inventors: Yuki Ninomiya, Yokkaichi (JP); Yuuki Tokunaga, Yokkaichi (JP); Ryuuichi Nagashima, Yokkaichi (JP); Yukihide Mochida, Yokkaichi (JP); Kenya Nagayoshi, Nagoya (JP); Michinobu In, Inaba (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 1002 days.

(21) Appl. No.: 17/085,429

(22) Filed: Oct. 30, 2020

(65) Prior Publication Data

US 2021/0045572 A1   Feb. 18, 2021

Related U.S. Application Data

(63) Continuation of application No. PCT/JP2019/015706, filed on Apr. 10, 2019.

(30) Foreign Application Priority Data

May 7, 2018 (JP) .................. 2018-089294
Sep. 14, 2018 (JP) .................. 2018-172335

(51) Int. Cl.
*A47J 31/44* (2006.01)
*A47J 31/10* (2006.01)

(52) U.S. Cl.
CPC ........... *A47J 31/4425* (2013.01); *A47J 31/10* (2013.01)

(58) Field of Classification Search
CPC ........ A47J 31/10; A47J 31/52; A47J 31/4492; A47J 31/44; A47J 31/06; B67D 1/08
See application file for complete search history.

(56) References Cited

U.S. PATENT DOCUMENTS 9,702,858 B1 * 7/2017 Minvielle ............... G06F 17/00
2006/0108023 A1   5/2006 Greiwe et al.

FOREIGN PATENT DOCUMENTS

| FR | 3053231 A1 * | 1/2018 | .......... A47J 31/4492 |
| JP | 2005537113 A | 12/2005 | |
| JP | 2005537195 A1 * | 12/2005 | ............. A47J 31/52 |
| JP | 2006138766 A | 6/2006 | |
| JP | 2010037050 A | 2/2010 | |
| JP | 2013190882 A * | 9/2013 | ............. G07F 13/00 |

(Continued)

OTHER PUBLICATIONS

Machine translation of JP 2017159941 A performed on Oct. 18, 2023, Ban et al. (Year: 2017).*

(Continued)

*Primary Examiner* — Dana Ross
*Assistant Examiner* — Kevin Guanhua Wen
(74) *Attorney, Agent, or Firm* — Rabin & Berdo, P.C.

(57) ABSTRACT

A beverage server configured to make a beverage and dispense the beverage into a container placed therein. The beverage server includes an information acquisition unit configured to acquire information of the container placed in the beverage server, and a container identification unit configured to identify a type of the container based on the information acquired by the information acquisition unit.

13 Claims, 6 Drawing Sheets

(56) References Cited

FOREIGN PATENT DOCUMENTS

| JP | 2014176484 A | | 9/2014 | | |
|----|----|----|----|----|----|
| JP | 2015029544 A | | 2/2015 | | |
| JP | 2015119964 A | | 7/2015 | | |
| JP | 2017159941 A | * | 9/2017 | ............... | B67D 1/08 |
| WO | WO 2007059275 A2 | * | 5/2007 | ............... | A23L 1/00 |
| WO | WO 2014043652 A1 | * | 3/2014 | ............... | A23F 5/02 |

OTHER PUBLICATIONS

Machine translation of JP 2013190882 A performed on Oct. 18, 2023, Ninomiya (Year: 2013).*
Machine translation of FR 3053231 A1 performed on Oct. 18, 2023, Blanc et al. (Year: 2018).*
Machine translation of JP 2005537195 A1 performed on Sep. 24, 2024, Griewe et al. (Year: 2005).*
PCT/ISA/210; International Search Report issued Jul. 9, 2019 in International (PCT) Application No. PCT/JP2019/015706.
PCT/ISA/237; Written Opinion of the International Searching Authority issued Jul. 9, 2019 in International (PCT) Application No. PCT/JP2019/015706.

* cited by examiner

FIG.5

BEVERAGE SERVER

CROSS-REFERENCE TO RELATED APPLICATION(S)

This application is a continuation of International Application No. PCT/JP2019/015706, filed on Apr. 10, 2019 which claims the benefit of priority of the prior Japanese Patent Application Nos. 2018-089294, filed on May 7, 2018, and 2018-172335, filed on Sep. 14, 2018, the entire contents of which are incorporated herein by reference.

BACKGROUND

The present disclosure relates to a beverage server, particularly, to a beverage server such as a coffee machine usually installed in stores including, for example, convenience stores.

In the related art, Beverage servers such as coffee machines are installed in stores including convenience stores. In response to user's operation to select a beverage, the beverage server makes the selected beverage, for example, by grinding coffee beans and extracting coffee by dripping, and dispenses the beverage into a container, which is a cup.

In order to prevent a user from selecting a wrong beverage, a beverage server allows a reading unit to read information for specifying a beverage written on a beverage plate, makes the beverage according to the read information, and dispenses into a container (for example, see Japanese Laid-open Patent Publication No. 2015-29544).

SUMMARY

There is a need for providing a beverage server that can prevent users from selecting wrong beverages and enhance usability.

According to an embodiment, a beverage server, which dispenses a beverage made by a beverage making unit into a container placed in a beverage serving unit, includes: an information acquisition unit acquiring information items on the container; and a container identification unit identifying a type of the container based on the information items acquired by the information acquisition unit.

DETAILED DESCRIPTION

In the related art, the beverage server described in Japanese Laid-open Patent Publication No. 2015-29544 needs a special plate in addition to a container, which is inconvenient for users.

Preferred embodiments of a beverage server according to the present disclosure will now be described in detail with reference to the accompanying drawings.

Figure 1:
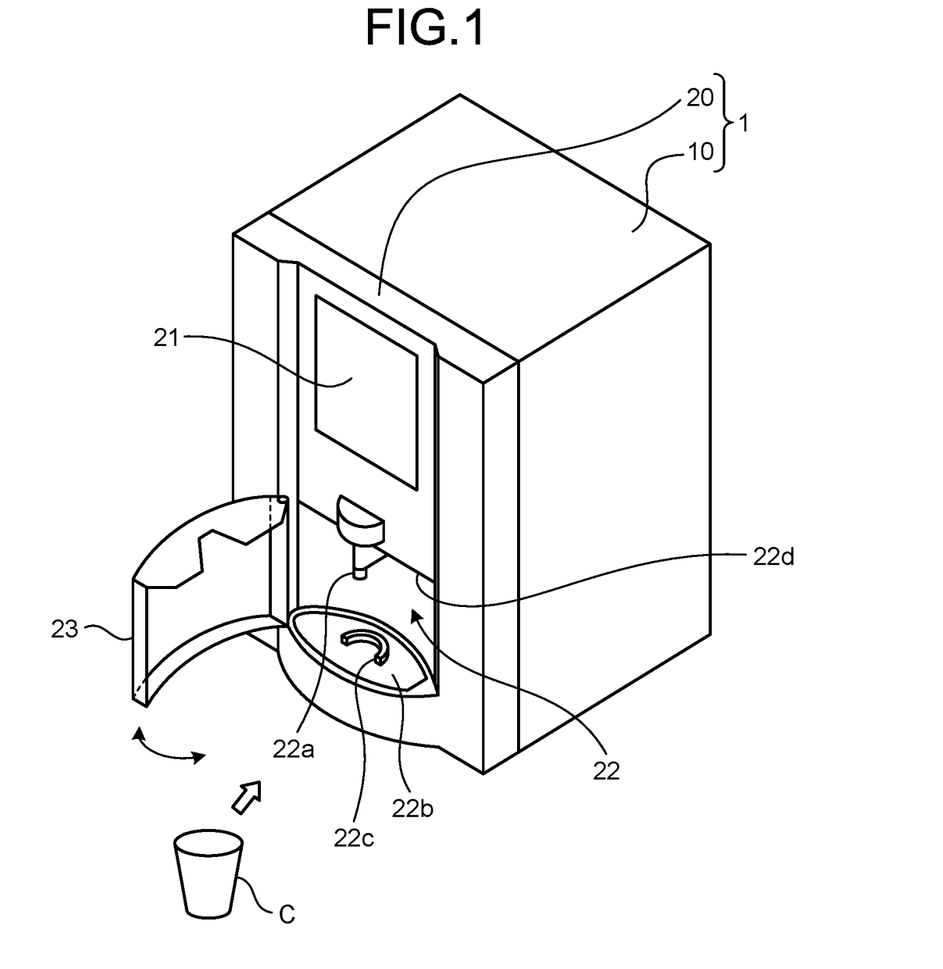
FIG. 1 is a perspective exterior view of a beverage server of an embodiment of the present disclosure.
Figure 2:
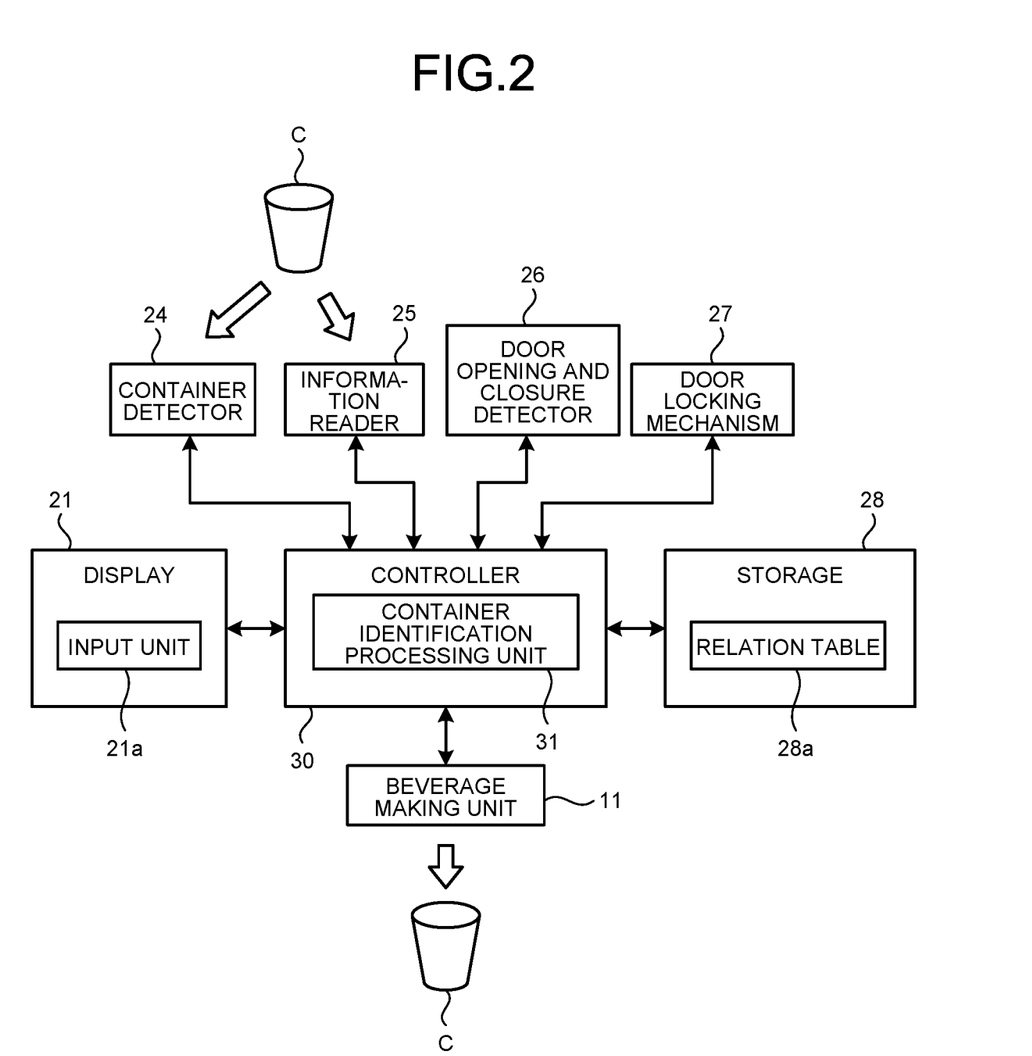
FIG. 2 is a block diagram that schematically illustrates the control system of the beverage server of the embodiment of the present disclosure.

FIG. 1 and FIG. 2 illustrate the beverage server of an embodiment of the present disclosure. FIG. 1 is a perspective exterior view, and FIG. 2 is a block diagram that schematically illustrates a control system. The example beverage server is a coffee machine installed in a store, such as a convenience store. The beverage server makes beverages including coffee by, for example, grinding coffee beans and extracting drips, and dispenses the beverage into a container C, which is a cup or the like. This type of beverage server includes an appliance body 1.

The appliance body 1 includes a body cabinet 10 and a front door 20. The body cabinet 10 is substantially rectangular with its front surface open. The body cabinet 10 accommodates therein a beverage making unit 11 that makes beverages (for example, coffee).

The front door 20 is a door that is large enough to cover the open front surface of the body cabinet 10. The front door 20 is pivotable around a center axis of a shaft (not illustrated) provided at one side end in the front of the body cabinet 10 and extended along the height direction. The front door 20 allows the front opening of the body cabinet 10 to open and close.

The front door 20 has a front surface to serve customers, the front surface including a display 21, a beverage serving unit 22, and an openable door 23. The display 21 is formed of, for example, a liquid crystal touch screen that displays various kinds of information. The display 21 includes an input unit 21a on which input operation, such as touching, is performed.

The beverage serving unit 22 is located under the display 21 and includes a nozzle 22a and a stage 22b. The nozzle 22a downwardly discharges a beverage made by the beverage making unit 11. The stage 22b is under the nozzle 22a. The container C is placed on the stage 22b. The stage 22b includes an arcuate stopper 22c.

The openable door 23 is, for example, made of a light-transmissive material such as resin, and is large enough to cover an entrance 22d of the beverage serving unit 22. The openable door 23 has its left end pivotally supported by the front door 20 and is turnable along the front-rear direction. The openable door 23 is turnable along the front-rear direction in a fashion that approaches and separates from the beverage serving unit 22. The openable door 23 turns rearward and approaches the beverage serving unit 22 to close the entrance 22d of the beverage serving unit 22, and turns frontward and separates from the beverage serving unit 22 to make the entrance 22d of the beverage serving unit 22 open.

As illustrated in FIG. 2, the beverage server includes a container detector 24, an information reader 25, a door opening and closure detector 26, a door locking mechanism 27, and a controller 30.

The container detector 24 uses, for example, an optical sensor, and detects the presence or absence of the container C in the beverage serving unit 22, in other words, detects whether the container C is placed on the stage 22b. The container detector 24 sends the result of detection on the presence or absence of the container C, to the controller 30.

The information reader 25 is arranged in the beverage serving unit 22 and reads characteristic information on the container C, such as the size, the material, and the color of the container. The information reader 25 sends the read characteristic information to the controller 30.

The characteristic information read by the information reader 25 will now be described. With regards to the size of the container C, the information reader 25 detects the height, the largest width, and the like of the container C using, for example, a built-in optical sensor and reads information on whether the container C is a large size or regular size.

The information reader 25 detects variation in reflection and refraction of light on the container C using, for example, a built-in optical sensor and identifies the material of the container C. More specifically, the information reader 25 reads information on, for example, whether the container C is made of paper, plastic, or another material.

Figure 3:
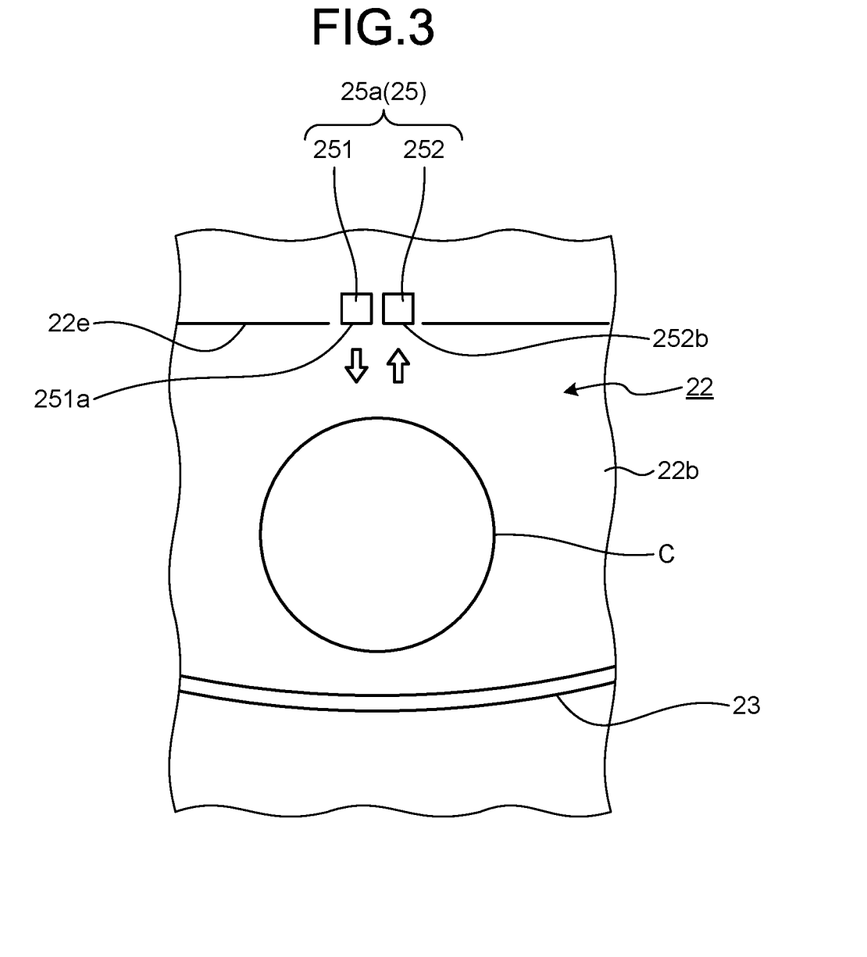
FIG. 3 is a schematic drawing that illustrates an example layout of components of an information reader illustrated in FIG. 2.
Figure 4:
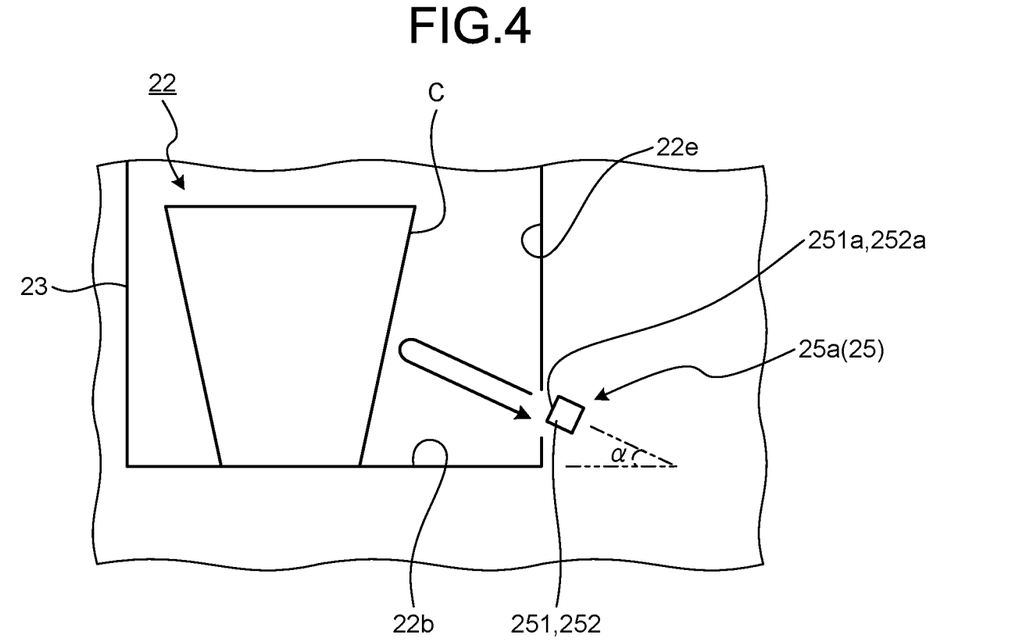
FIG. 4 is another schematic drawing that illustrates the example layout of components of the information reader illustrated in FIG. 2.

More specifically, as illustrated in FIG. 3, the information reader 25 includes optical sensors 25a having a light-emitting unit 251 and a light-receiving unit 252 juxtaposed to each other, on rear 22e of the beverage serving unit 22. The light-emitting unit 251 emits light onto the container C, and the light-receiving unit 252 receives light. The optical sensor 25a is turned on in a light emitting state of the light-emitting unit 251 when the light-receiving unit 252 receives light, and is turned off when the light-receiving unit 252 does not receive light. The intensity of light from the light-emitting unit 251 is controlled depending on the material (paper or plastic) of the container C.

The light-emitting unit 251 and the light-receiving unit 252 that are included in the optical sensor 25a respectively have a light-emitting portion 251a and a light-receiving portion 252a, each of which is slanted at a predetermined angle $\alpha$ relative to the stage 22b on which the container C is placed. The predetermined angle $\alpha$ is preferably from 5° to 35°, more preferably, from 7° to 30°.

As for the color of the container C, the information reader 25 further detects the color of the container C using a built-in RBG sensor or a similar device and reads information on, for example, whether the container C is white or blown. The information reader 25 may include an imaging unit having, instead of the above RBG sensor, a complementary metal oxide semiconductor (CMOS) image sensor or the like mounted thereon, and may read color information from image information on the container C, photographed by the imaging unit.

A door opening and closure detector 26 is disposed near the entrance 22d of the beverage serving unit 22 and is formed of, for example, an optical sensor. The door opening and closure detector 26 detects whether the entrance 22d is open or closed by the openable door 23. More specifically, the door opening and closure detector 26 detects whether the entrance 22d is closed, that is, whether the openable door 23 is in its closed position. The door opening and closure detector 26 sends the result of detection on whether the openable door 23 is in its closed position, to the controller 30.

The door locking mechanism 27 is disposed near the entrance 22d of the beverage serving unit 22. The door locking mechanism 27 is selectively switchable between a locking state and an unlocking state. The locking state maintains the openable door 23 for closing the entrance 22d in its closed position and keeps the openable door 23 from turning frontward. The unlocking state allows the openable door 23 to turn frontward. The states of the door locking mechanism 27 are switched in response to instruction of the controller 30.

The controller 30 is electrically connected with the above beverage making unit 11, the display 21, the container detector 24, the information reader 25, the door opening and closure detector 26, and the door locking mechanism 27. The controller 30 integrally controls their respective operations in accordance with a computer program and data stored in a storage 28 that is also electrically connected with the controller 30. The controller 30 includes a container identification processing unit (a container identification unit) 31 that performs later-described identification processing to identify the type of container.

The controller 30 may be implemented by software, in other words, by causing a processor such as a central processing unit (CPU) to execute a computer program, or by hardware such as an integrated circuit (IC), or by combination of software and hardware.

The storage 28 includes a relation table 28a that stores characteristic information read and obtained by the information reader 25 and the type of the container C, in association with each other.

Figure 5:
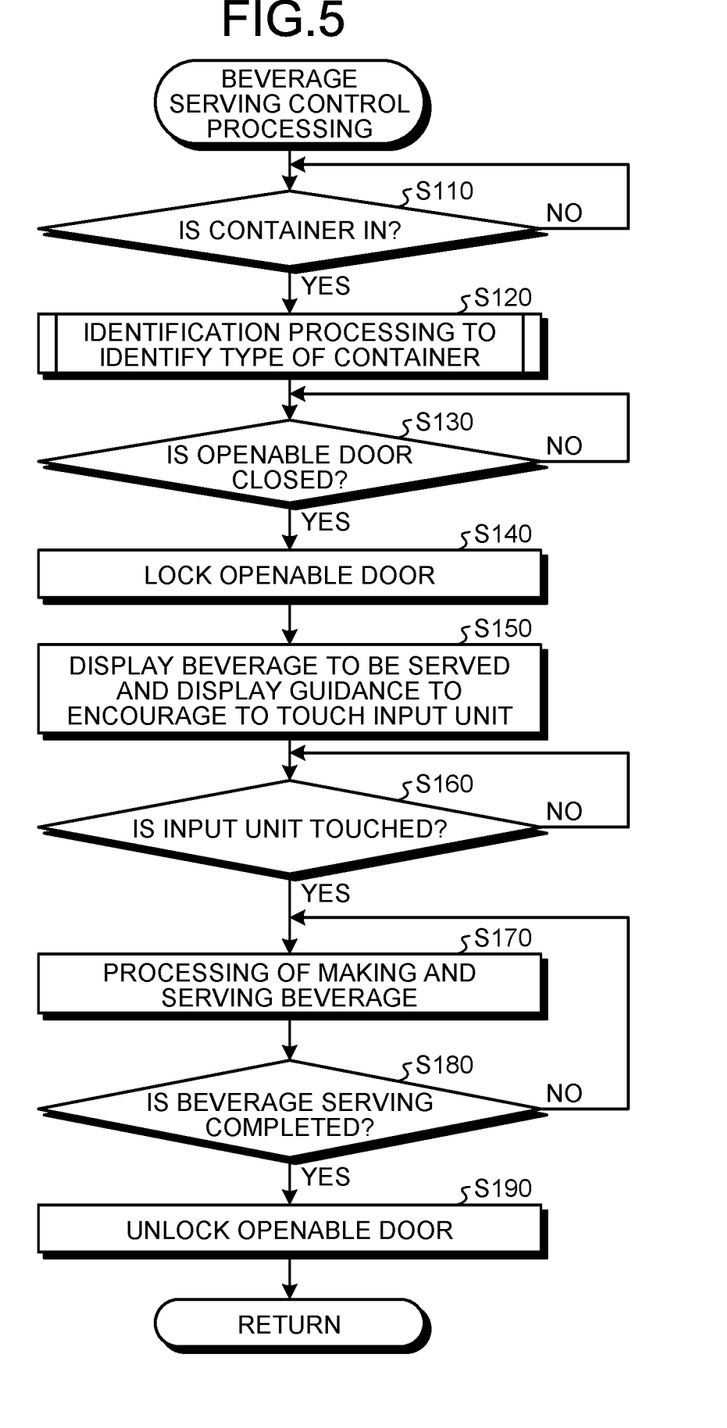
FIG. 5 is a flowchart that illustrates a processing flow of beverage serving control processing performed by a controller illustrated in FIG. 2.

FIG. 5 is a flowchart that illustrates a processing flow of beverage serving control processing performed by the controller 30 illustrated in FIG. 2. Operation of the beverage server will now be described by referring to the processing flow of the beverage serving control processing.

In this beverage serving control processing, the controller 30 determines whether the container detector 24 detects the presence of the container C in the beverage serving unit 22 (Step S110). In other words, the container detector 24 detects whether the container C is on the stage 22b. If the container detector 24 detects the presence of the container C (Yes at Step S110), the controller 30 allows the container identification processing unit 31 to perform identification processing to identify the type of the container (Step S120). If the container detector 24 detects the absence of the container C (No at Step S110), the controller 30 repeats the determination processing of Step S110.

Figure 6:
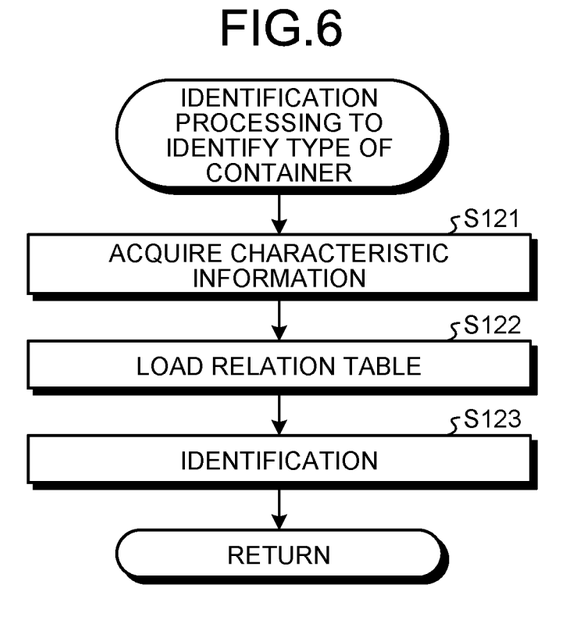
FIG. 6 is a flowchart that illustrates a processing flow of identification processing of FIG. 5 to identify the type of container.

FIG. 6 is a flowchart that illustrates the processing flow of the identification processing of FIG. 5 to identify the type of container. In the identification processing to identify the type of container, the container identification processing unit 31 of the controller 30 acquires characteristic information (the size, the material, and the color of the container C) read by the information reader 25 (Step S121).

The container identification processing unit 31 loads the relation table 28a from the storage 28 (Step S122) and identifies the type of the container C using the acquired characteristic information and the relation table 28a (Step S123). More specifically, the container identification processing unit 31 determines whether numerical information given by quantifying a plurality of pieces of acquired characteristic information is consistent with the numerical information on a corresponding element in the relation table 28a, and determines the type of the container C for which the above-described pieces of numerical information are consistent with each other. The container identification processing unit 31 thus identifies the type of the container C, returns the procedure, and ends the current container-type identification processing.

After performing the identification processing of identifying the type of container, the controller 30 determines whether the openable door 23 is closed based on the result of detection given by the door opening and closure detector 26 (Step S130). If the openable door 23 is determined not to be closed (No at Step S130), the determination processing of Step S130 is repeated. If the openable door 23 is determined to be closed (Yes at Step S130), the controller 30 locks the openable door 23 in its closed position using the door locking mechanism 27 (Step S140).

The controller 30 allows the display 21 to display a beverage corresponding to the container C the type of which has been identified at above Step S120, in other words, to display a beverage to be served, along with a guidance to encourage the user to touch the input unit 21a displaying a confirmation message (Step S150).

The controller 30 determines whether the input unit 21a is touched (Step S160). If the input unit 21a is determined not to be touched (No at Step S160), the controller 30 repeats the determination processing of Step S160. If the input unit 21a is determined to be touched (Yes at Step S160), the controller 30 allows the beverage making unit 11 to perform processing of making and serving the target beverage (Step S170). The controller 30 determines whether the beverage making unit 11 has finished serving the beverage (Step S180). If the beverage serving has not yet been completed (No at Step S180), the controller 30 returns the process to Step S170 to continue the processing of making and serving the beverage. If the beverage serving has been completed (Yes at Step S180), the controller 30 allows the door locking mechanism 27 to unlock the openable door 23 from the closed position (Step S190) and returns the process and ends the current processing.

As described above, in the beverage server, the information reader 25 and the controller 30 function as information acquisition units and acquire characteristic information including the size, the material, and the color of the container C.

In the beverage server, the information reader 25 and the controller 30 acquire characteristic information including the size, the material, and the color of the container C, and the container identification processing unit 31 identifies the type of the container C based on the acquired characteristic information and the relation table 28a. This configuration eliminates the necessity of using specific plates for the beverages as the ones used in the conventional servers and is therefore convenient for users. This configuration can prevent the users from selecting a wrong beverage and thus can enhance usability.

In the beverage server, the information reader 25 and the controller 30 acquire characteristic information including the size, the material, and the color of the container C, and the container identification processing unit 31 identifies the type of the container C based on the acquired characteristic information and the relation table 28a. Using a plurality pieces of information to identify the type of the container C can increase accuracy in identification of the type of the container C.

In the beverage server, the type of the container C is identified after the container detector 24 detects the presence of the container C in the beverage serving unit 22.

This procedure uniquely defines the timing of identification, which can reduce errors of identification.

Furthermore, the type of the container C is identified before the openable door 23 is shut, that is, before the entrance 22d of the beverage serving unit 22 is closed. This manner can save the time taken to serve the beverage.

In the beverage server, the openable door 23 is kept locked while the beverage making unit 11 is serving a beverage. This manner can prevent the user from, for example, burning himself or herself.

In the above beverage server, the light-emitting unit 251 and the light-receiving unit 252 of the optical sensor 25a of the information reader 25 are arranged such that the respective light-emitting portion 251a and light-receiving portion 252a are slanted relative to the stage 22b, on which the container C is placed, at a predetermined angle α. Light beams slanted relative to the stage 22b at the angle α are therefore emitted from the light-emitting unit 251 and received by the light-receiving unit 252. In the absence of the container C on the stage 22b, this configuration is effective in preventing false detection of light reflected through the openable door 23. Furthermore, obliquely shining light onto the container C is effective in preventing a light beam reflected through the container C from sharpening, which can reduce false detection. Furthermore, increasing the illuminated area of the container C can reduce the effect of locally irregular surface of the container C.

A preferred embodiment of the present disclosure has been described. It should be noted that the embodiment is not intended to limit the present disclosure and various changes can be made.

In the above embodiment, the information reader 25 reads characteristic information including the size, the material, and the color of the container C. The information reader 25 may read characteristic information including the size, the temperature, and the color of the container C. As for the temperature of the container C, information about the size and the color of the container C is read as described above. Information about the temperature of the container C is obtained by detecting the surface temperature of the container C using, for example, a built-in non-contact temperature sensor. The temperature information can tell whether the container C is for hot drinks or cold drinks.

The information reader 25 configured to read characteristic information including the size, the temperature, and the color of the container C is similarly effective in preventing users from selecting a wrong beverage and thus can improve usability, as with the above embodiment. Using a plurality pieces of information to identify the type of the container C can increase the accuracy in the identification of the type of the container C.

In the above embodiment, the information reader 25 reads characteristic information including the size, the material, and the color of the container C. The information reader 25 may read characteristic information including the size, the weight, and the color of the container C. Information about the size and the color of the container C is read as described above. As for the weight of the container C, the information reader 25 obtains information about the weight of the container C by detecting the weight of the container C using, for example, a built-in weight sensor. The weight information can tell whether the container C is empty to be filled with a hot drink or contains ice blocks for cold drinks.

The information reader 25 configured to read characteristic information including the size, the weight, and the color of the container C is similarly effective in preventing users from selecting a wrong beverage and thus can improve usability, as with the above embodiment. Using a plurality pieces of information to identify the type of the container C can increase the accuracy in the identification of the type of the container C.

The information reader 25 described above reads characteristic information including the size, the material, and the color of the container C, or characteristic information including the size, the temperature, and the color of the container C, or characteristic information including the size, the weight, and the color of the container C. Information acquisition unit of the present disclosure may obtain information relating to the container other than the size, the material, the temperature, the weight, and the color.

In the above embodiment, the type of the container C is identified by comparing acquired characteristic information with the relation table 28a. In the present disclosure, the order of priority may be previously given to these pieces of characteristic information, and the type of the container may be identified in accordance with the order of the priority.

In the above embodiment, the type of the container C is identified after the container detector 24 determines that the container C is present in the beverage serving unit 22. According to the present disclosure, the type of the container may be identified after the openable door is determined to be shut.

In the beverage serving control processing described in the above embodiment, the beverage server determines whether the openable door 23 is shut (Step S130) after identification processing to identify the type of the container is performed (Step S120). According to the present disclosure, the determination whether the openable door 23 is shut (Step S130) may be performed after the determination that the container detector 24 has detected the presence of the container C in the beverage serving unit 22 (Step S110). In this case, it is preferable that the processing of locking the openable door 23 in the closed position using the door locking mechanism 27 (Step S140) be performed after the processing of determining whether the input unit 21a has been touched (Step S160).

REFERENCES SIGNS LIST

According to an embodiment, an information acquisition unit acquires information on a container, and a container identification unit identifies the type of the container based on the information acquired by the information acquisition unit. The configuration needs no specific plates as the conventional machines, which is convenient for users. The present disclosure therefore exerts advantageous effects of preventing users from selecting wrong beverages and enhancing usability.

Although the present disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The invention claimed is:

1. A beverage server that has
a beverage making unit for making a beverage,
a beverage serving unit for a container to be placed therein,
an openable door that opens and closes an entrance of the beverage serving unit, and
a display including an input unit,
the beverage server being configured to cause the beverage making unit to make the beverage and dispense the beverage into the container placed in the beverage serving unit, the beverage server comprising:
an information acquisition unit including a plurality of information acquisition devices configured to acquire a plurality of pieces of information of the container from the container placed in the beverage server, each piece of information being acquired independently from a different one of the plurality of information acquisition devices; and
a controller including a container identification unit configured to identify a single type of the container based on the plurality of pieces of information acquired by the information acquisition unit, wherein
the controller is configured to
identify the single type of the container using the container identification unit,
confirm that the openable door is locked,
cause the display
to display a single beverage thereon, which is to be supplied and which corresponds to the single type of the container determined by the container identification unit, and
to subsequently display a guide information thereon to prompt a user to perform a single touch operation onto the input unit of the display, and in response to the touch operation received at the input unit, cause the beverage making unit to make the beverage to be supplied and dispense the beverage into the container.

2. The beverage server according to claim 1, wherein
said plurality of pieces of information are respectively characteristic information on a size of the container, characteristic information on a material of the container, and characteristic information on a color of the container.

3. The beverage server according to claim 2, wherein
the plurality of information acquisition devices include a light-emitting unit to emit light to the container and a light-receiving unit to receive light, for acquiring the characteristic information on the material of the container, and
the light-emitting unit and the light-receiving unit include a light-emitting portion and a light-receiving portion, respectively, and are arranged such that each of the light-emitting portion and the light-receiving portion is slanted relative to a surface on which the container is placed, at a predetermined angle.

4. The beverage server according to claim 3, wherein the predetermined angle is in a range from 5° to 35°.

5. The beverage server according to claim 1, wherein
said plurality of pieces of information are respectively characteristic information on a size of the container, characteristic information on a temperature of the container, and characteristic information on a color of the container.

6. The beverage server according to claim 1, wherein
said plurality of pieces of information are respectively characteristic information on a size of the container, characteristic information on a weight of the container, and characteristic information on a color of the container.

7. The beverage server according to claim 1, further comprising:
a container detector configured to detect placement of the container in the beverage serving unit, wherein
the container identification unit identifies the single type of the container when the container detector detects the placement of the container.

8. The beverage server according to claim 1, further comprising:
a door opening and closing detector configured to detect the opening and closing of the entrance by the openable door, wherein
the container identification unit identifies the single type of the container, when the door opening and closure detector detects the closing of the entrance.

9. A beverage server that has
a beverage making unit for making a beverage,
a beverage serving unit for a container to be placed therein, an openable door that opens and closes an entrance of the beverage serving unit, and a display including an input unit, the beverage server being configured to cause the beverage making unit to make the beverage and dispense the beverage into the container placed in the beverage serving unit, the beverage server comprising:

an information reader including a plurality of information acquisition devices configured to read the container placed in the beverage server to acquire a plurality of pieces of information of the container, each piece of information being acquired independently from a different one of the plurality of information acquisition devices; and a controller configured to identify a single type of the container based on the plurality of pieces of information acquired by the information reader, wherein the controller is configured to identify the single type of the container, confirm that the openable door is locked, cause the display to display a single beverage thereon, which is to be supplied and which corresponds to the single type of the container identified by the controller, and to subsequently display a guide information thereon to prompt a user to perform a single touch operation onto the input unit of the display, and in response to the touch operation received at the input unit, cause the beverage making unit to make the beverage to be supplied and dispense the beverage into the container.

10. The beverage server of claim 9, wherein the plurality of information acquisition devices include at least one of a first optical sensor for detecting dimensions of the container, to thereby acquire information on a size of the container, a second optical sensor for detecting variation in reflection and refraction of light on the container, to thereby acquire information on a material of the container, an RGB sensor or an imaging device, for detecting a color of the container, a temperature sensor for detecting a surface temperature of the container, or a weight sensor for detecting a weight of the container.

11. The beverage server of claim 10, wherein the information reader includes the first optical sensor, one of the RGB sensor or an imaging device, and one of the second optical sensor, the temperature sensor or the weight sensor.

12. The beverage server of claim 9, wherein the controller is an integrated circuit.

13. The beverage server of claim 9, wherein the controller includes a processor, and a non-transitory storage medium having program instructions stored thereon, execution of which by the processor causes the controller to identify the single type of the container based on the acquired information.

* * * * *